US012276495B2

(12) United States Patent
Araujo et al.

(10) Patent No.: US 12,276,495 B2
(45) Date of Patent: Apr. 15, 2025

(54) FLATNESS MEASURING SYSTEM, METHOD AND APPARATUS

(71) Applicant: Hamar Laser Instruments, Inc., Danbury, CT (US)

(72) Inventors: Carlos Araujo, Danbury, CT (US); Roderick M. Hamar, Sandy Hook, CT (US)

(73) Assignee: Hamar Laser Instruments, Inc., Danbury, CT (US)

( * ) Notice: Subject to any disclaimer, the term of this patent is extended or adjusted under 35 U.S.C. 154(b) by 76 days.

(21) Appl. No.: 18/229,893

(22) Filed: Aug. 3, 2023

(65) Prior Publication Data

US 2025/0044081 A1 Feb. 6, 2025

(51) Int. Cl.
*G01B 11/30* (2006.01)
(52) U.S. Cl.
CPC .................. *G01B 11/306* (2013.01)
(58) Field of Classification Search
CPC .......... G01B 11/26; G01B 5/14; G01B 11/00; G01B 11/24; G01B 11/14; G01B 11/02; G01B 11/0608; G01B 11/026; G01B 11/2518; G01B 21/16; G01B 11/16; G01B 11/306; G01B 15/00; G01B 21/02; G01B 11/245; G01B 11/27; G01B 3/1061; G01B 11/002; G01B 11/272; G01B 3/1092; G01B 11/2433; G01B 11/25; G01B 11/30; G01B 2003/1066; G01B 2003/1079; G01B 21/22; G01B 21/32; G01B 3/00; G01B 3/002; G01B 3/04; G01B 3/1071; G01B 3/20; G01B 5/0025; G01B 5/061; G01B 21/00; G01B 21/20; G01B 3/11; G01B 5/063; G01B 5/25; G01B 11/0691; G01B 11/18; G01B 11/22; G01B 11/2425;
(Continued)

(56) References Cited

U.S. PATENT DOCUMENTS 5,269,070 A 12/1993 Thurston
6,043,889 A * 3/2000 Garner ................ G01B 11/272
356/138

(Continued)

FOREIGN PATENT DOCUMENTS

CH 651135 A5 8/1985
CN 1743797 A * 3/2006
(Continued)

*Primary Examiner* — Michael P Stafira
(74) *Attorney, Agent, or Firm* — Gerald E. Hespos; Michael J Porco

(57) ABSTRACT

An apparatus is provided for measuring flatness of a surface of a plate. The apparatus has a rail that is positionable on the plate. A laser assembly has a laser base mounted in proximity to a first end of the rail and a laser emitter is mounted to the laser base so that a laser beam is directed substantially parallel to the rail and offset laterally from the rail. A target has a lower surface movably positionable on the plate at a position laterally adjacent to the rail and spaced from the laser emitter. The target is configured to identify a point of impingement of the laser beam on the target. The target can be moved to other positions along the rail and flatness of the plate can be assessed by identifying differences in points of impingement of the laser at different positions of the target.

10 Claims, 11 Drawing Sheets

(58) Field of Classification Search
CPC .. G01B 11/2513; G01B 11/275; G01B 17/00; G01B 17/06; G01B 2003/1064; G01B 2003/1087; G01B 21/08; G01B 3/06; G01B 3/1003; G01B 3/1056; G01B 3/1089; G01B 5/0002; G01B 5/0004; G01B 5/0014; G01B 5/02; G01B 5/143; G01B 5/20; G01B 5/245; G01B 5/252; G01B 7/02; G01B 11/005; G01B 11/022; G01B 11/028; G01B 11/03; G01B 11/12; G01B 11/167; G01B 11/2416; G01B 11/2504; G01B 11/2522; G01B 11/254; G01B 11/2545; G01B 11/255; G01B 11/303; G01B 2003/1074; G01B 21/24; G01B 2210/12; G01B 2210/24; G01B 2210/26; G01B 3/1084; G01B 5/00; G01B 5/24; G01B 5/28; G01B 5/285

See application file for complete search history.

(56) References Cited

U.S. PATENT DOCUMENTS

| | | | |
|---|---|---|---|
| 6,497,047 | B1 | 12/2002 | Miyagawa et al. |
| 7,322,229 | B2 | 1/2008 | Wilhelm |
| 7,335,280 | B2 | 2/2008 | Lampi et al. |
| 10,763,147 | B2 | 9/2020 | Taguchi et al. |
| 2008/0225280 | A1 | 9/2008 | Jiang et al. |

FOREIGN PATENT DOCUMENTS

| | | | | | |
|---|---|---|---|---|---|
| CN | 105783795 | A | * | 7/2016 | ............ G01B 11/30 |
| CN | 108120403 | A | * | 6/2018 | ............ G01B 11/30 |
| CN | 108168469 | A | * | 6/2018 | ............ G01B 11/26 |
| CN | 109000596 | A | * | 12/2018 | ............ G01B 11/30 |
| CN | 110186371 | A | * | 8/2019 | |
| CN | 113513986 | A | * | 10/2021 | |
| CN | 113959418 | A | * | 1/2022 | |
| DE | 2001414 | | | 7/1971 | |
| JP | 58-111707 | | | 7/1983 | |
| KR | 20140144004 | A | * | 12/2014 | |
| WO | WO-2024068850 | A1 | * | 4/2024 | ........... G01B 11/306 |

* cited by examiner

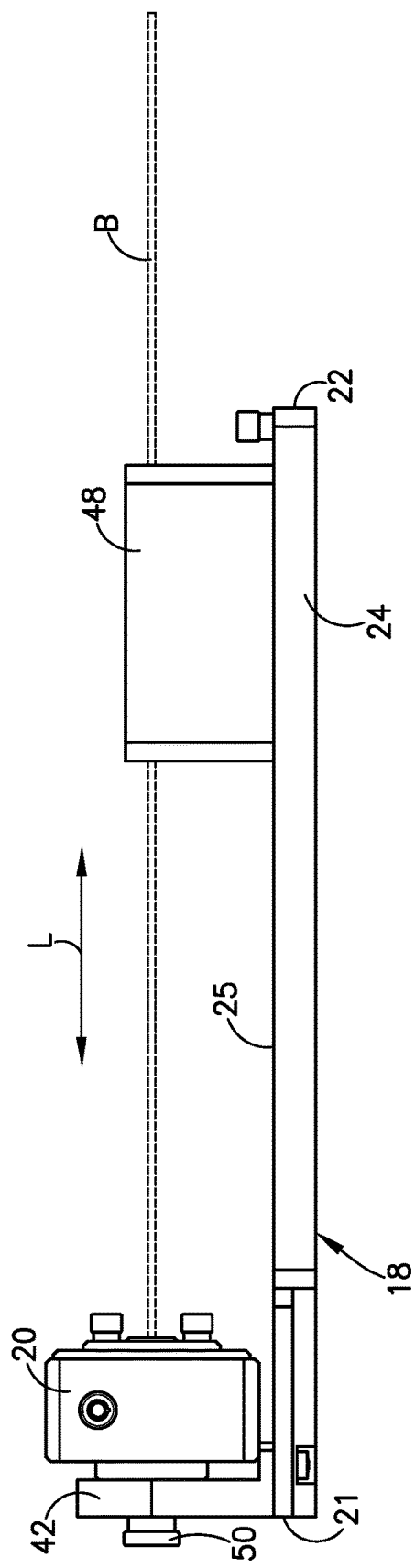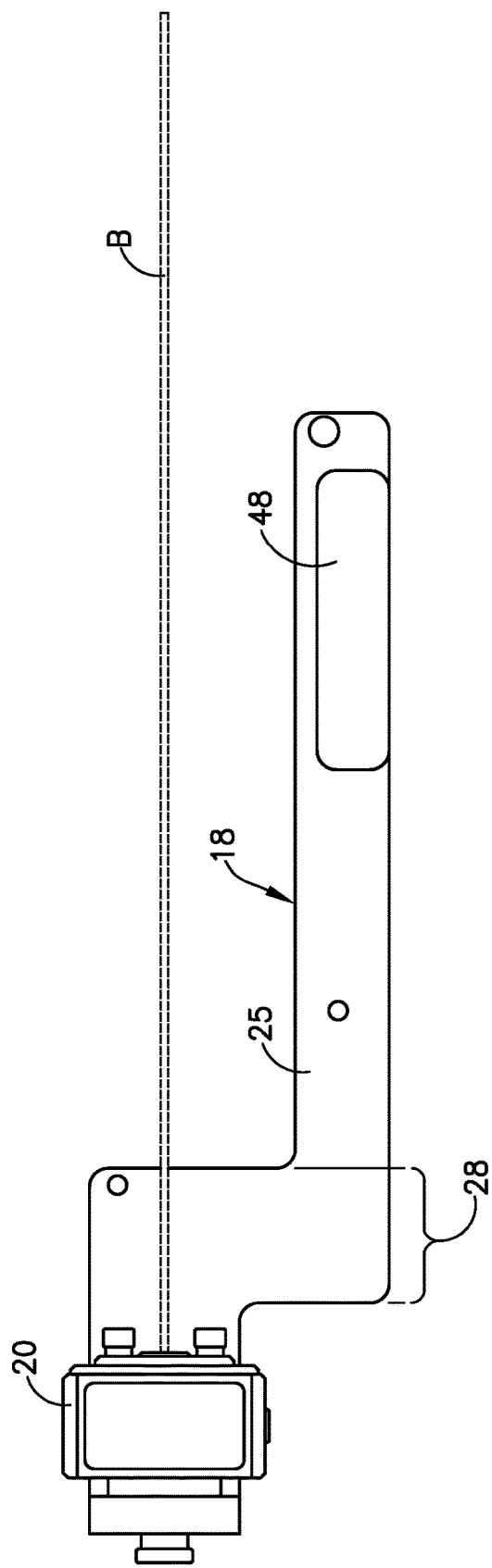

FLATNESS MEASURING SYSTEM, METHOD AND APPARATUS

BACKGROUND

1. Field of the Invention

The invention relates to a laser apparatus for measuring the flatness of a substrate.

2. Related Art

Igneous rock (granite) plates are used for high accuracy locating, layout and inspection work. Accuracy of the locating, layout and inspection work is dependent upon the flatness of the plate. For example, a plate can bow so that the middle part of the plate is higher or lower than the ends and/or sides. A plate also can twist about one or more axes extending along the plate. For example, the four corners of a twisted rectangular plate will not lie in a common plane. At least a portion of a plate also may not be smooth, thereby creating rough regions that can affect accuracy of the locating, layout or inspection work that will be carried out on the plate.

The American Society of Mechanical Engineers (ASME) has a committee that produces publications defining various aspects of granite plate flatness and optional ways for measuring flatness of a plate (ASME B89.3.7). The test guidance provided by the ASME publication includes an eight-line calibration method that is referred to as the Moody method. The Moody method takes measurements along the lines adjacent to opposite ends of a rectangular plate, along opposite sides of the rectangular plate, along a line centrally between the opposite ends of the rectangular plate, along a line centrally between the opposite sides of the rectangular plate and along both diagonals of the rectangular plate. The ASME does not specify any particular measurement apparatus for use in the eight-line calibration method, and mentions angle measurement tools, such as auto collimators, electronic levels, spirit levels and laser interferometers.

Lasers are used frequently for measuring the alignment of objects relative to one another, such as aligning a rotational tool to a desired rotational axis. The typical laser alignment apparatus includes one or more laser emitters, one or more light sensitive targets and a control unit connected to the light sensitive target. The target senses a laser beam impinging on the target and identifies the center of energy of the laser beam. The control unit analyzes signals received from the target and uses those signals to determine the position of the point of impingement of the laser beam on the light sensitive target and possibly the angular alignment of the laser beam relative to the target. An example of a commercially available laser alignment device is the Hamar Laser Model 743.

U.S. Pat. Nos. 6,038,050 and 6,292,303 are assigned to the assignee of this application and disclose laser alignment devices that can generate plural perpendicular beams and/or a rotating laser beam that produces a plane that is perpendicular to a laser beam extending along an axis of rotation of the rotating beam. The disclosures of U.S. Pat. Nos. 6,038,050 and 6,292,303 are incorporated herein by reference.

U.S. Pat. No. 6,497,047 discloses a flatness measuring system that has a bar supported by adjustable legs at a position above a plate that is to be assessed for flatness. A laser source is fixed to one end of the bar and a light receiving sensor is built into a movable member that can move along the bar at a position above the plate. The movable member also has a distance sensor that is configured to measure a distance between the bottom of the movable member and the plate. Readings made by the laser source on the light receiving member are used to determine the amount of sag or the bar, and the distance measurements made by the movable member are summed with the amount of sag of the bar to determine flatness of the plate.

JP 58-111707 discloses a flatness measuring device for measuring the flatness of a surface of an apparatus. The device includes a light projector and a detection apparatus that can be moved along the surface that is to be measured. Part of the light beam from the light projector is reflected by a mirror of the detection apparatus toward a detector that is parallel to the surface that is to be assessed for flatness. The position of the reflected beam on the detector is used to determine the flatness at the particular location of the detector or apparatus.

US 2008/0225280 discloses a surface flatness testing device that has a light emitting unit and a light receiving unit. A workpiece is positioned between the light emitting unit and the light receiving unit and has a testing surface that is to be assessed for flatness. The testing surface of the workpiece is positioned above a platform by a known distance. An adjusting unit is positioned on the platform and has an upper surface that is spaced from the platform by a known distance. If the distance of the workpiece above the platform exceeds the distance of the upper surface of the adjusting unit, light from the light emitting unit will be permitted to proceed to the light receiving unit. However, if the testing surface has deformities, light from the light emitting unit may be unable to reach the light receiving unit. Thus, readings obtained by the light receiving unit are considered indicative of the flatness of the testing surface.

An object of the invention is to provide an apparatus, system and method for assessing flatness of a plate in a manner that is easy to set up while providing a high degree of accuracy and repeatability.

SUMMARY

The invention relates to an apparatus, system and method for measuring flatness of a substrate, such as a granite plate. The apparatus includes an elongate linear rail. The rail has opposite first and second ends defining a length. In some embodiments, the length of the rail is selected to equal or exceed a maximum surface dimension of the plate, such as a diagonal dimension of a rectangular plate. The rail further has opposite top and bottom surfaces defining a thickness for the rail and opposite lateral sides defining a width of the plate. The bottom surface of the rail is planar or has plural bottom surface regions that lie in a common plane.

The apparatus and system further include means for releasably attaching the rail to the surface of the plate that is to be assessed for flatness. For example, vacuum clamps can be secured releasably to the surface of the plate and can exert holding forces against the rail for tightly positioning the rail against the surface of the plate.

A laser assembly is provided for mounting to or near the rail. The laser assembly of some embodiments includes a base with opposite first and second ends spaced from one another along a longitudinal direction of the base. The base also includes opposite upper and lower surfaces.

A maximum width portion is formed on the base at a position spaced from the first and second ends of the base and at a position closer to the first end than to the second end. The maximum width portion has opposite first and second lateral sides. A channel is formed in the lower surface of the maximum width portion of the base and extends in the longitudinal direction of the base. The channel of some embodiments is closer to the second side of the base than to the first side. The channel has opposed first and second side surfaces facing toward one another. The first side surface is closer to the first side of the maximum width portion and the second side surface is closer to the second side of the maximum width portion. The first and second side surfaces of the channel define a width substantially equal to the width of the rail. Additionally, the channel has a depth substantially equal to the thickness of the rail. As a result, the rail can be received slidably in the channel extending along the maximum width portion of the base.

The base further includes a laser mounting portion extending from the maximum width portion to the first end of the base. The laser mounting portion has opposite first and second lateral sides. In some embodiments the first lateral side of the laser mounting portion is aligned with the first lateral side of the maximum width portion of the base. The laser mounting portion also has a second lateral side, which in some embodiments is offset inwardly from the second side of the maximum width portion and in some embodiments is aligned with the first side surface of the channel in the lower surface of the maximum width portion. In some embodiments, a rabbet groove may be formed along the lower surface of the base adjacent the second lateral side of the laser mounting portion. The rabbet groove of this embodiment defines a depth substantially equal to the depth of the channel in the major width portion and, in this embodiment, a side surface of the rabbet groove may align with the first side surface of the channel.

A laser mounting wall protrudes up from the laser mounting portion at a position on the top surface of the base adjacent the first end of the base. A mounting aperture extends through the laser mounting wall in a direction parallel to the longitudinal direction of the base. A center of the mounting aperture through the laser mounting wall is offset laterally from the first side surface of the channel by a known distance. Additionally, the center of the mounting aperture through the laser mounting wall is offset vertically from the lower surface of the base by a known distance.

The base further may include a slide extending from the maximum width portion to the second end of the base. The slide has opposite first and second sides. In some embodiments, the second side of the slide aligns with the second side edge of the maximum width portion. The second side of the slide of some embodiments is offset inwardly from the second side of the maximum width portion. A rabbet groove may be formed along the lower surface of the base adjacent the first side of the slide. The rabbet groove defines a depth substantially equal to the depth of the channel in the major width portion and aligns with the second side surface of the channel.

A counterweight may extend up from the slide of the base at a position at or near the second end of the base and at or near the second side of the slide. The counterweight is disposed to offset moments that could be generated and could cause the base to rotate inadvertently in a manner and in a direction that could lead to inaccurate readings or in extreme circumstances could damage parts of the apparatus.

A laser emitter is mounted to the laser mounting wall of the base. More particularly, a threaded bolt is passed through the mounting aperture in the laser mounting wall of the base and may be engaged threadedly in a corresponding threaded receptacle in the laser emitter. The laser emitter is operative to generate a beam that will extend substantially parallel to the upper and/or upper surface of the base and at a position offset laterally from the slide of the base and parallel to the lower surface of the base. The apparatus further includes a target assembly. The target assembly includes a target base with a lower surface that can be positioned directly on the surface of the plate that is to be measured for flatness. The target base further includes a target mounting wall extending perpendicularly from the lower surface and hence perpendicular to the surface of the plate. A mounting aperture extends through the target mounting wall in a direction substantially parallel to the lower surface of the base. A front surface of the target mounting wall includes a centering projection with a V-shaped groove extending perpendicular to the lower surface of the target base.

A target is mounted to the target base. More particularly, the target includes a opposite front and rear faces. The front face includes a photosensitive cell that produces a signal when impinged upon by light, such as a laser beam. An alignment structure may be formed on the rear face of the target and engages with corresponding positioning structure on the front surface of the target mounting wall of the target base. For example, a tooling ball may be mounted to the rear face of the target and may engage with the V-shaped groove in the centering projection on the target mounting wall of the target base. Engagement of the tooling ball in the V-shaped groove in the target wall will automatically align the target relative to the target base. The rear face of the target may further include a threaded aperture that can receive a threaded bolt that has been passed through the mounting aperture that extends through the target mounting wall. The tightening of the bolt will bring the target into alignment as the tooling ball is urged centrally into the V-shaped groove. The plane of the photosensitive cell is aligned perpendicular to the surface of the plate when the target is mounted to the front face of the target mounting wall.

The apparatus further includes a control unit that communicates with the target either wirelessly or via a wired connection. The control unit is operative to store signals received by the target and converts those signals into measurement data indicative of the flatness of the plate, as explained further below. In the context of this disclosure, a "control unit" can be understood to include, for example, a processor and/or a storage unit or memory for storing algorithms and program commands. By way of example, the processor and/or the control unit is specifically configured to carry out program commands in such a way that the processor and/or the control unit carries out functions to implement or realize a method as disclosed herein or a step of a method as disclosed herein. The term control unit is used here synonymously with devices known from the prior art. A control unit, therefore, encompasses a "computer" and accordingly comprises one or more general-purpose processors (CPUs) or microprocessors, RISC processors, GPUs and/or DSPs. The control unit or computer has for example additional elements such as storage interfaces of communication interfaces. Optionally or additionally, the terms "control unit" and "computer" refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory. In the context of this disclosure, a "storage unit"

can be understood to mean, for example, a volatile memory in the form of random access memory (RAM) or a permanent memory such as a hard disk drive or a data medium or, for example, a replaceable storage module or a cloud-based storage solution The apparatus is used by mounting the rail on the surface that is to be assessed for flatness. For example, the rail can be mounted to extend along one of the eight lines defined by the Moody diagram. The rail can be fixed in position on the surface by appropriate clamps, such as vacuum clamps. The laser assembly then is mounted to the rail at a position in proximity to an edge of the plate. The target assembly is mounted to a first position along the rails so that the light-sensitive cell of the target is facing toward the laser. The laser is activated so that a laser beam is directed toward the target and the position of the laser beam impinging upon the target. The target assembly then is repositioned along the rail and a further reading is undertaken. This procedure is repeated along the length of the rail until a predetermined number of readings is taken along the length of the rail. The rail then may be repositioned to another one of the eight lines specified by the Moody diagram and readings are taken again.

BRIEF DESCRIPTION OF THE DRAWINGS

FIG. 6 is a side elevational view of the laser assembly of FIG. 5.

FIG. 7 is a top plan view of the laser assembly of FIGS. 5 and 6.

DETAILED DESCRIPTION

Figure 1:
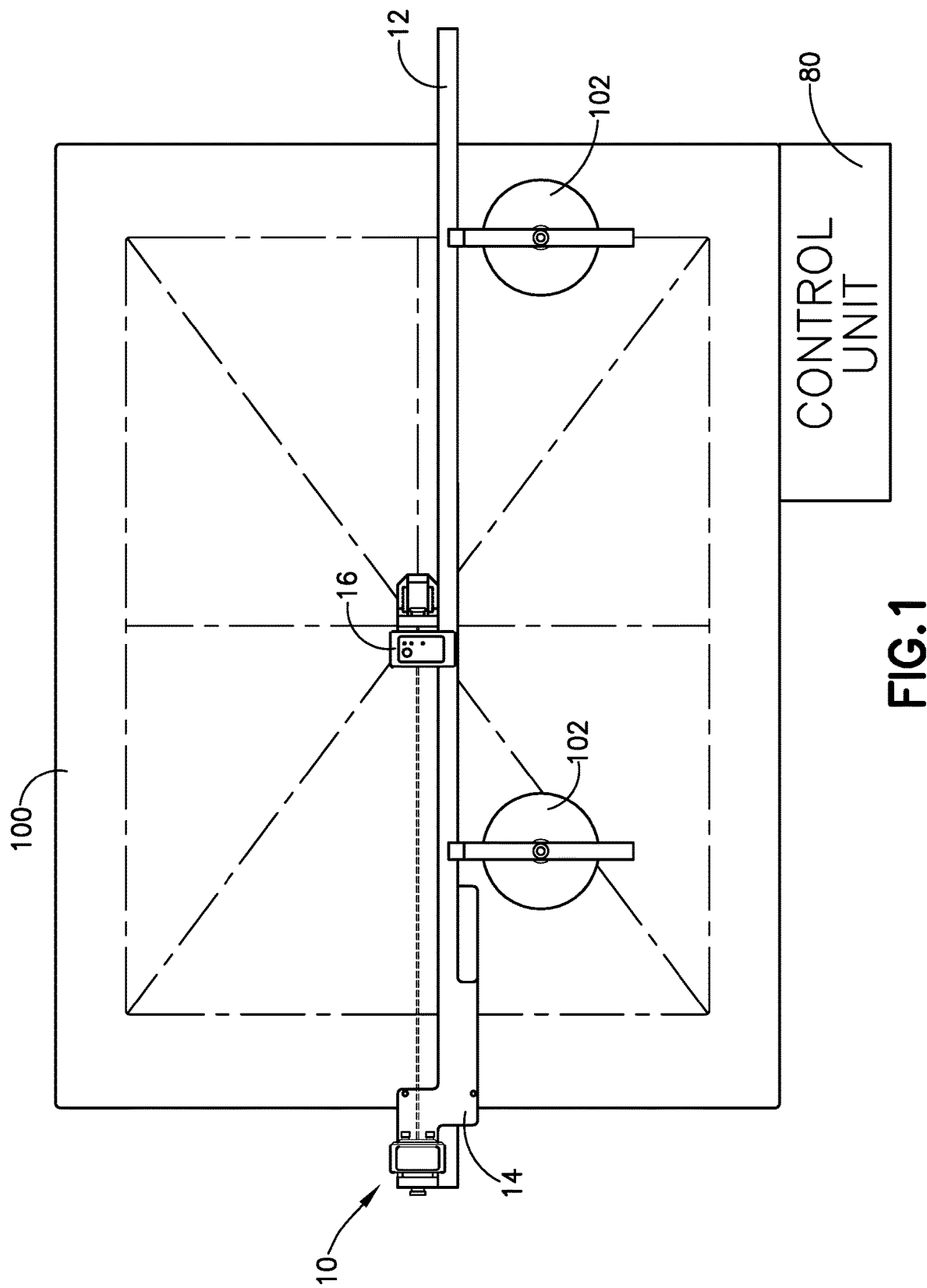
FIG. 1 is a top plan view of a flatness measuring system in accordance with an embodiment of the invention and mounted on a plate that will be assessed for flatness by the system.
Figure 2:
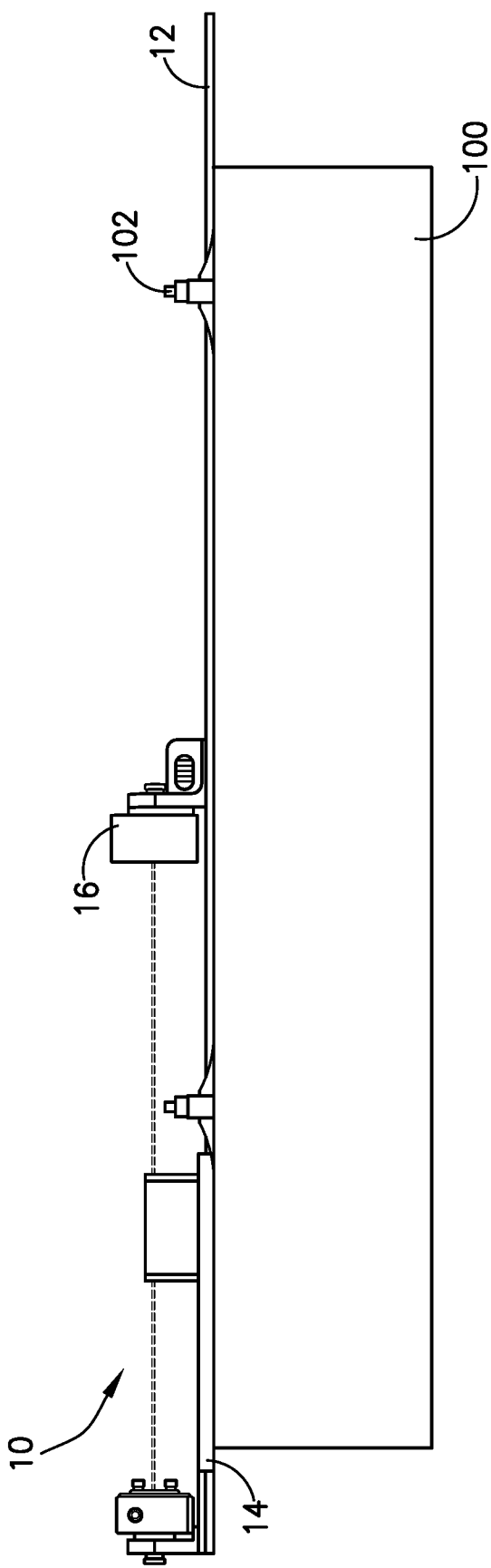
FIG. 2 is a side elevational view of the flatness measuring system and plate of FIG. 1.
Figure 3:
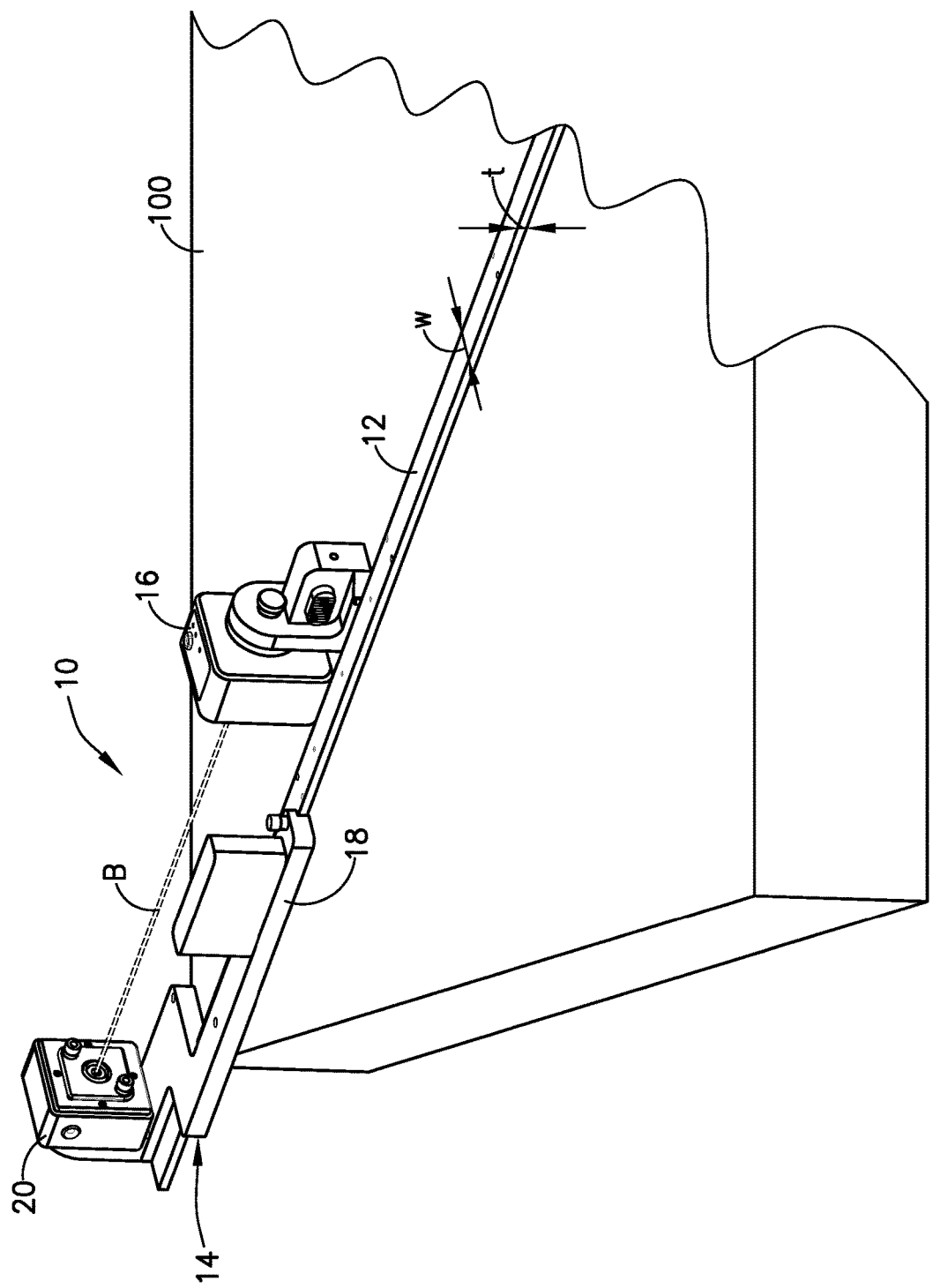
FIG. 3 is a perspective view of the flatness measuring system and plate of FIGS. 1 and 2.

An apparatus in accordance with an embodiment of the invention is identified generally by the numeral 10 in FIGS. 1-3. The apparatus 10 can be used for assessing the flatness of a plate 100, such as a granite plate that is used for high accuracy locating, layout and inspection work. The plate 100 illustrated in FIG. 1 is substantially rectangular, but other shapes (e.g. circular) can be used. A total of eight straight lines are illustrated in broken lines in FIG. 1 and represent a Moody method pattern. The eight lines of the Moody method pattern need not actually appear on the plate 100 and merely represent locations along which measurements are taken to assess the flatness of the plate 100. The apparatus 10 can be fixed removably to the plate 100 by, for example, vacuum clamps 102 along one of the lines of the Moody method pattern, and a plurality of flatness measurements are taken with the apparatus 10 in the manner described in detail below. The apparatus 10 then is moved to another one of the lines of the Moody method pattern so that additional flatness measurements can be taken. This process is carried out until measurements along all eight of the lines of the Moody method pattern are obtained.

The apparatus 10, as shown most clearly in FIG. 3, includes a rail 12, a laser assembly 14 and a target assembly 16.

Figure 4:
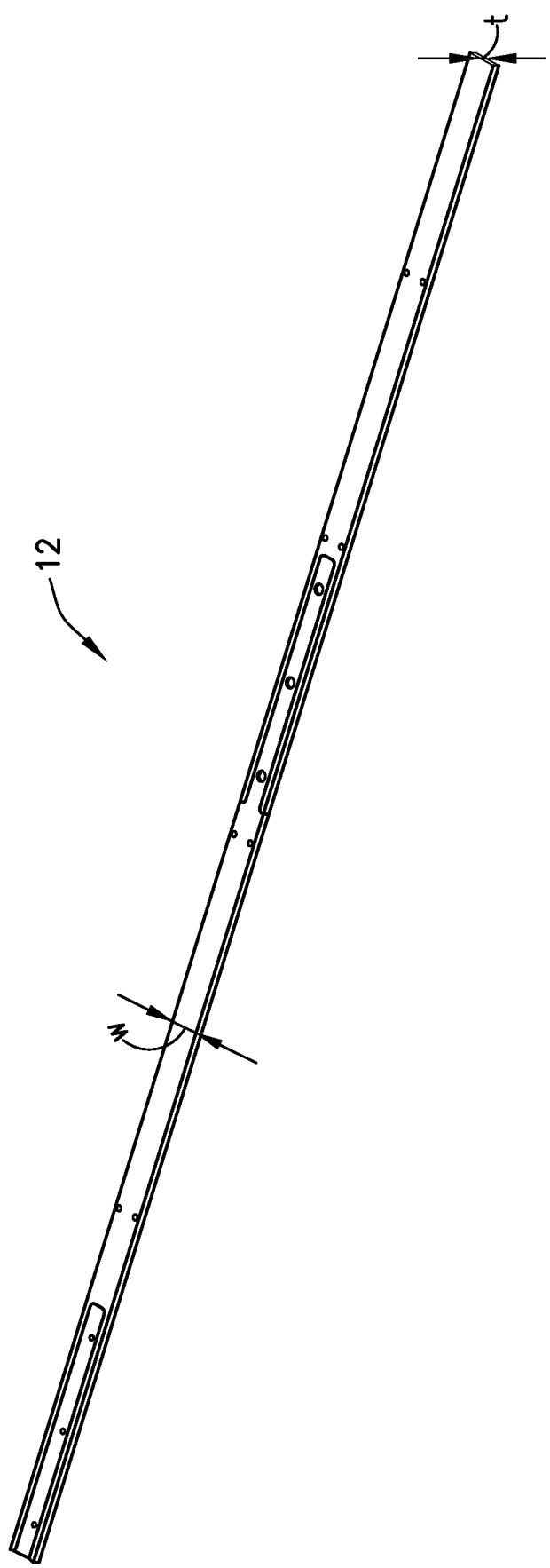
FIG. 4 is a perspective view of the rail of the system shown in FIGS. 1-3.
Figure 5:
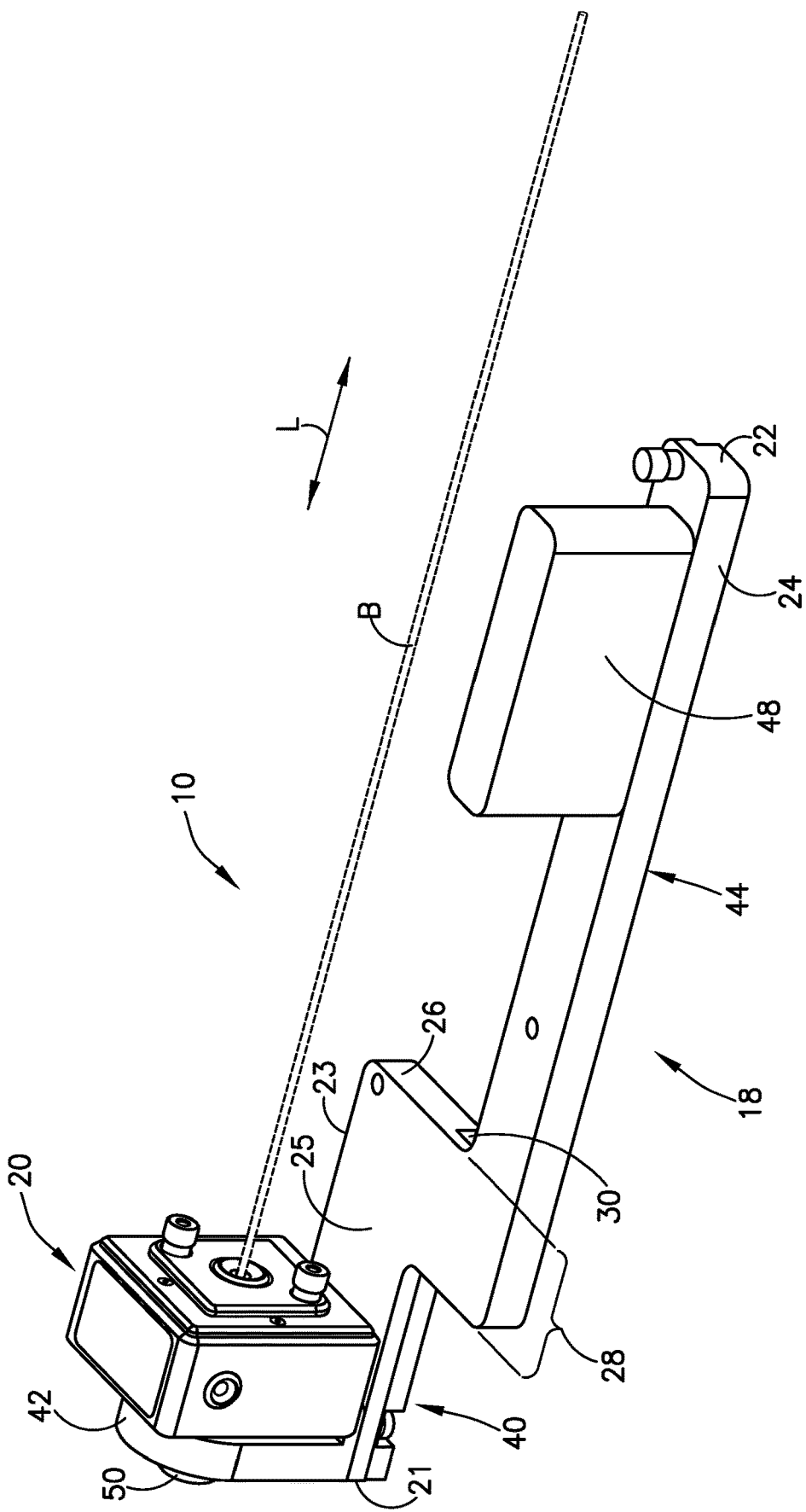
FIG. 5 is a perspective view of the laser assembly of the system shown in FIGS. 1-3.
Figure 8:
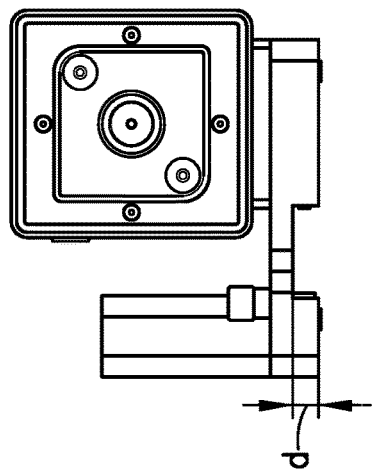
FIG. 8 is an end elevational view taken from the right end of FIGS. 5-7.

The rail 12 is formed from a metal material and has a length that preferably equals or exceeds the length of the diagonal lines of the Moody method pattern illustrated in FIG. 1. As shown most clearly in FIG. 4, the rail 12 has a width "w" and a thickness "t" that are uniform along the length of the rail 12. At least the top surface of the rail 12 is provided with numeric indicia to identify relative length positions along the rail 12.

The laser assembly 14 of the system 10 is illustrated most clearly in FIGS. 5-9. In this regard, the laser assembly 14 includes a base 18 and a laser emitter 20 that is operative to emit a laser beam B.

Figure 9:
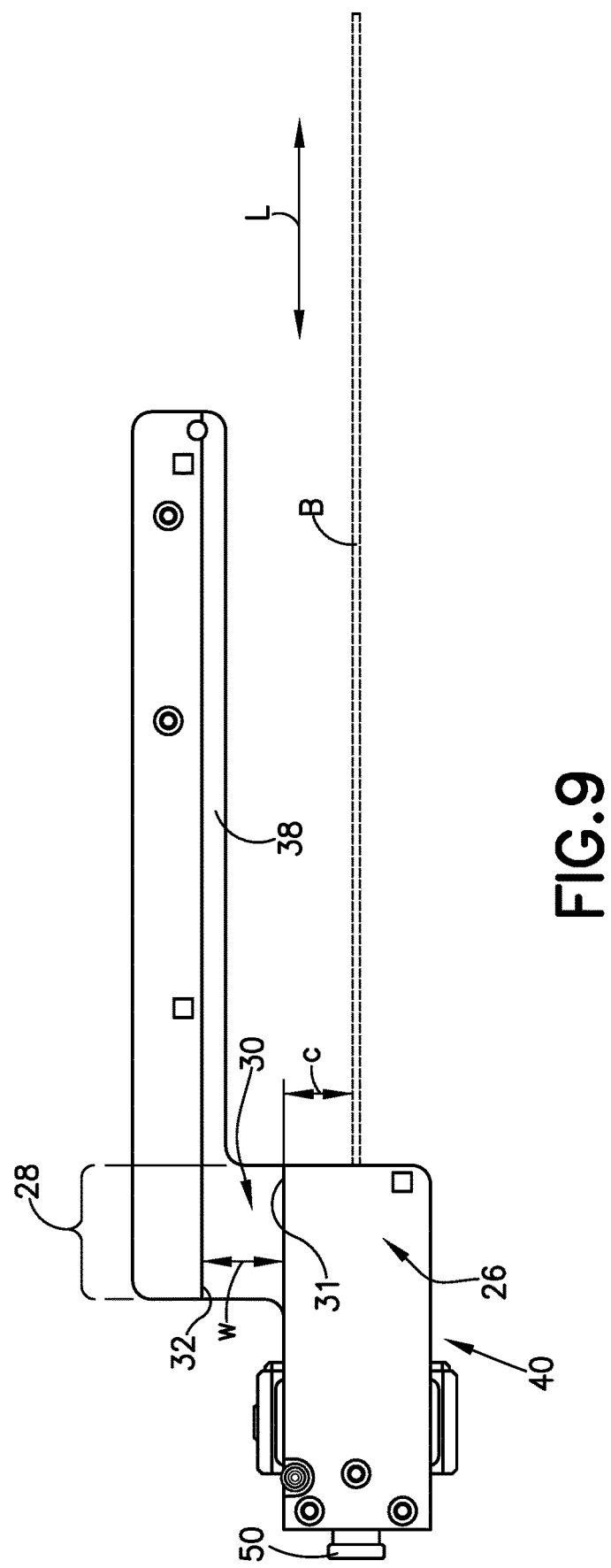
FIG. 9 is a bottom plan view of the laser assembly of FIGS. 5-8.
Figure 10:
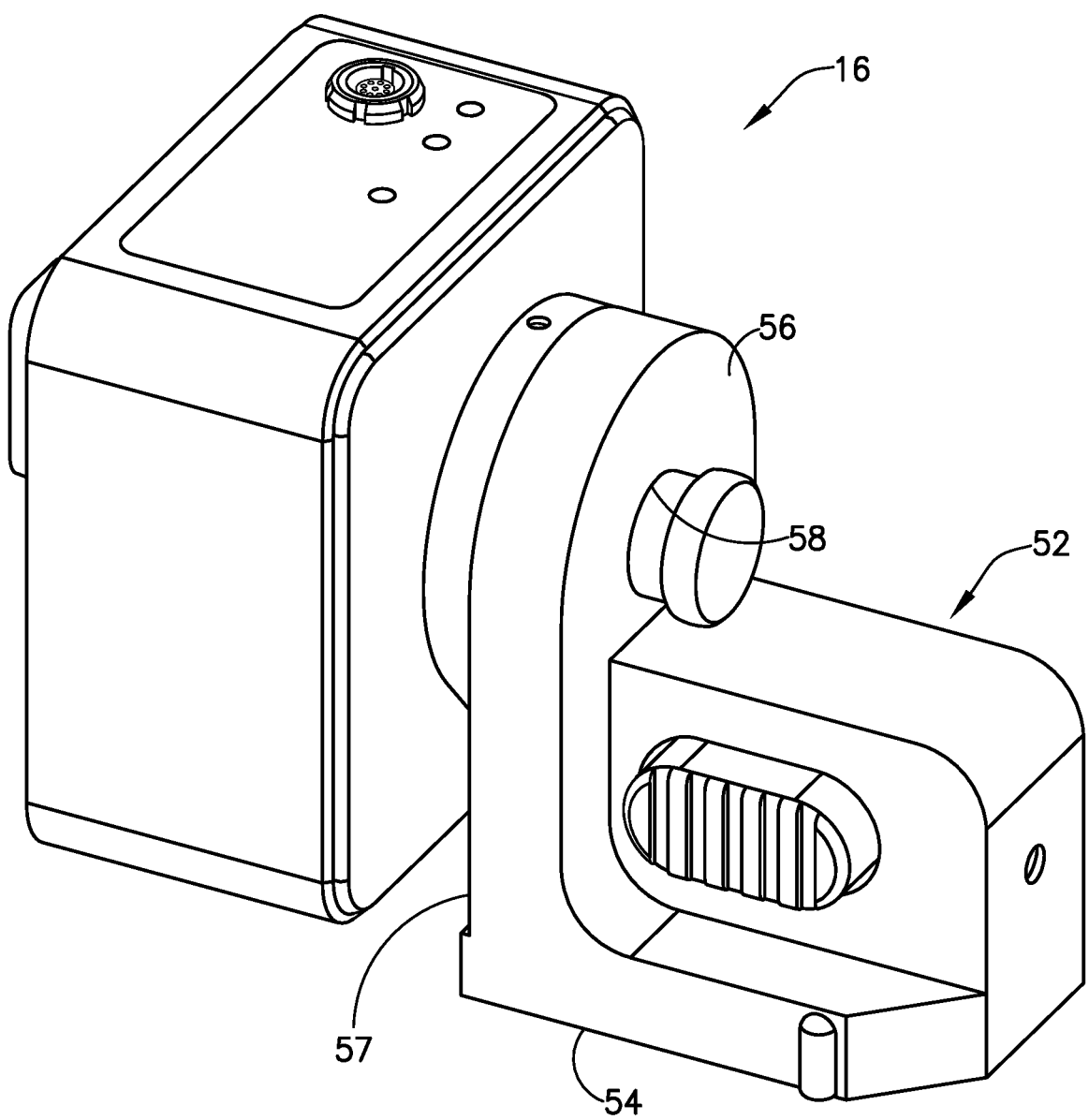
FIG. 10 is a perspective view of the target assembly of the system illustrated in FIGS. 1-3.
Figure 11:
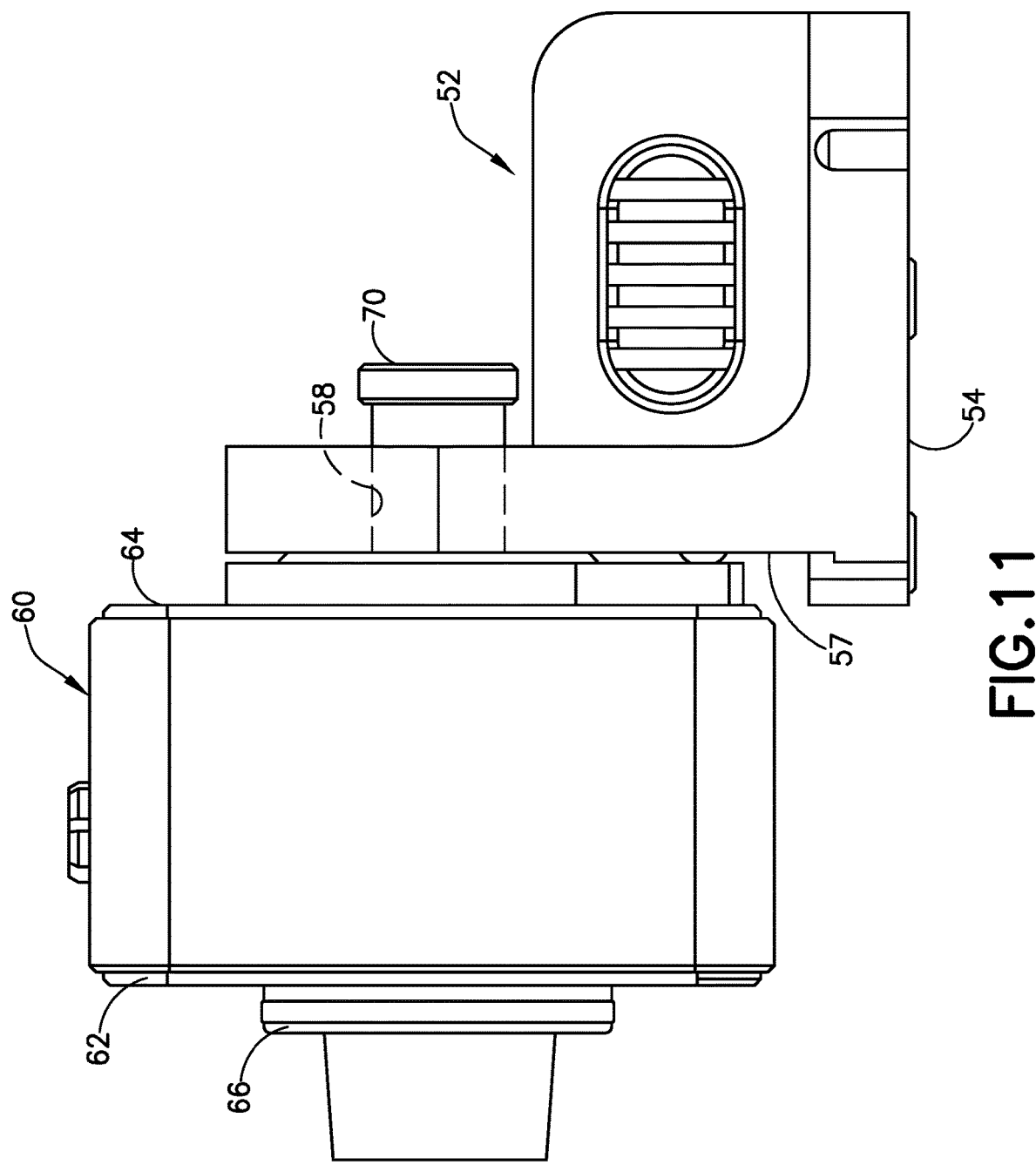
FIG. 11 is a side elevational view of the target assembly.
Figure 12:
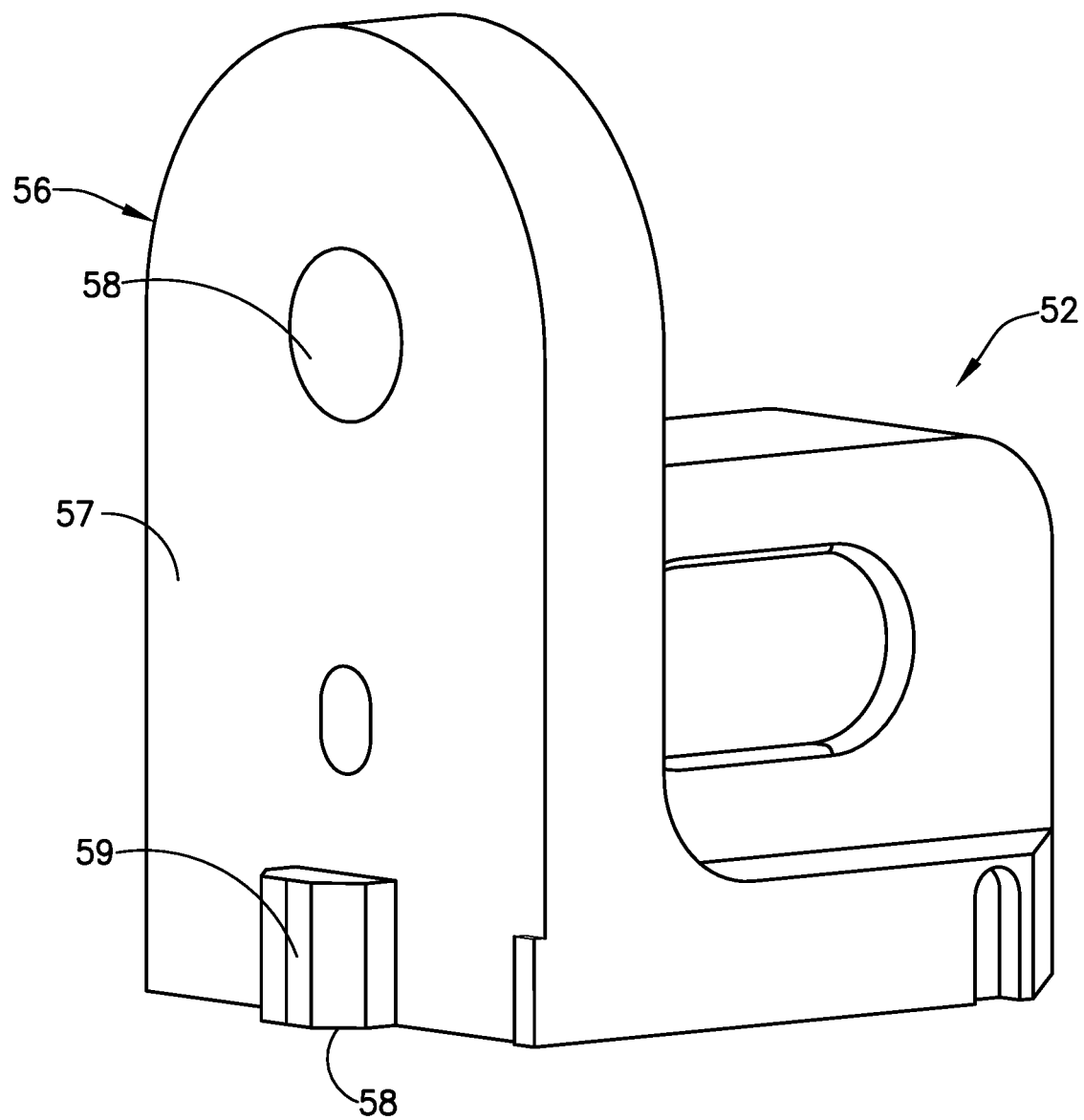
FIG. 12 is a front perspective view of the base of the target assemble.
Figure 13:
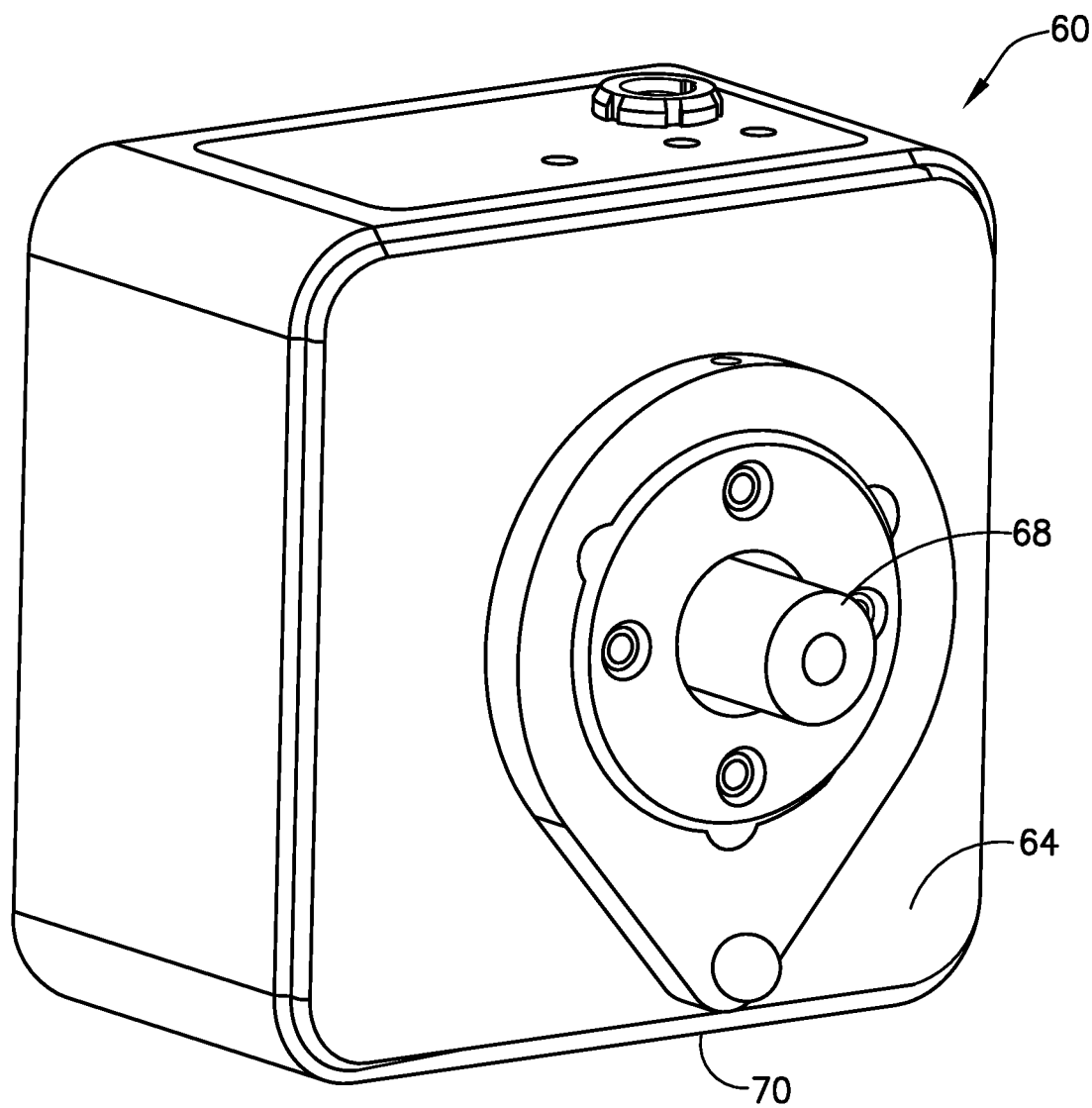
FIG. 13 is a rear perspective view of the target.

The base 18 of the laser assembly 14 has opposite first and second ends 21 and 22 that are spaced apart from one another along a longitudinal direction L of the base 18 and hence parallel to the laser beam B. The base 18 further includes opposite first and second lateral sides 23 and 24, a top surface 25 and a bottom surface 26. The base 18 has a major width portion 28 spaced from the opposite first and second ends 21 and 22 and extending from the first lateral side 23 to the second lateral side 24. The major width portion 25 includes a channel 30 extending parallel to the longitudinal direction L of the base 18, and hence parallel to the laser beam B. The channel 30 has opposite first and second side surfaces 31 and 32 that are parallel to one another and define a width w, as shown in FIG. 9, that is substantially equal to the width w of the rail 12. The channel 30 also has a depth d that is substantially equal to the thickness t of the rail 12.

The base 18 further includes a laser mounting portion 40 extending from the maximum width portion 28 to the first end 21 of the base 14. The first lateral side 23 of the base 18 of this embodiment extends continuously along the major width portion 28 and the laser mounting portion 40 in the longitudinal direction L of the base 18, and hence is substantially parallel to the laser beam B. An opposite lateral side of the laser mounting portion 40 of this embodiment is offset inwardly from the second lateral side 24 of the base 18 and is aligned substantially with the first side surface 31 of the channel 30. A laser mounting wall 42 protrudes up from the top surface 25 of the base 18 at a position adjacent the first end 21 of the base 18. A mounting aperture extends through the laser mounting wall 42 in a direction parallel to the longitudinal direction L of the base 18.

The base 18 further includes a slide 44 extending from the maximum width portion 28 to the second end 22 of the base 18. The slide 44 has opposite first and second lateral sides. The first lateral side of the slide 44 of this embodiment is offset inwardly from the first lateral side 23 of the maximum width portion 28 of the base 18 and the second lateral side of the slide 44 of this embodiment is aligned with the second lateral side 24 of the base 18. A rabbet groove 46 is formed along the lower surface 26 of the base 18 along the lateral side of the slide 44 that is opposite the second lateral side 24 of the base 18. The rabbet groove 46 defines a depth d substantially equal to the depth d of the channel 30 in the major width portion 28 of the base 18 and aligns with the second side surface 32 of the channel 30.

A counterweight 48 extends up from the slide 36 of the base 18 at a position at or near the second end 22 of the base 18 and substantially aligned with the second lateral side 24 of the base 18. The counterweight 48 is disposed to offset moments that could be generated and could cause the base 30 to rotate inadvertently in a manner and in a direction that could affect accuracy of readings or damage parts of the apparatus. For example, the counterweight 48 prevents the second end 22 of the base 18 from pivoting away from the plate 100 when the first end 21 of the base 18 projects to a position that is off the plate 100 and hence not supported by the plate 100.

The laser emitter 20 is mounted to the laser mounting wall 42 of the base 18. More particularly, a threaded bolt 50 is passed through the mounting aperture in the laser mounting wall 42 of the base 18 and is engaged threadedly in a corresponding threaded receptacle in the laser emitter 20. The laser emitter 20 is operative to generate the beam B that will extend substantially parallel to the upper surface 25 of the base 18 and at a position offset laterally from the channel 30 of the base 18, as shown in FIG. 9.

The target assembly 16 includes a target base 52 that has a lower surface 54 that can be positioned directly on the plate 100 that is to be measured for flatness. The target base 52 further includes a target mounting wall 56 extending perpendicularly from the lower surface 54. A mounting aperture 58 extends through the target mounting wall 56 in a direction substantially parallel to the lower surface 46 of the target base 52. A front surface 57 of the target mounting wall 56 includes a centering projection 58 with a groove 59 extending perpendicular to the lower surface 54 of the target base 52.

A target 60 is mounted to the target base 52. More particularly, the target 60 has opposite front and rear faces 62 and 64. The front face 62 includes a photosensitive cell 66 that produces a signal when impinged upon by light, such as the laser beam B. A mounting stud 68 projects perpendicularly from the rear face 64 of the target 60 and is dimensioned to be mounted in the mounting aperture 58 of the target mounting wall 56 of the target base 52. A threaded member 70 is engaged with the mounting stud 68 to hold the target 56 on the target mounting wall 56 of the target base 52. An adaptor 71 is mounted fixedly to the rear face 64 of the target 60. The adaptor 71 holds a tooling ball 72 that projects from the rear face 64 of the target 60 and engages with the groove 59 in the centering projection 58 that extends on the front surface 57 of the target mounting wall 56 of the base 44. The tooling ball 72 can have a diameter of e.g. 0.2498-0.2502 inch, and the groove 59 in the centering projection 58 has a width e.g. of 0.2503-0.2505 inch. These relative dimensions will result in a very small angular play of the target 50, with corresponding high accuracy and repeatability. The tooling ball 72 and the centering projection 58 having the groove 59 can be reversed in some embodiments so that the tooling ball is on the front face of the target mounting wall 56 and a centering projection with a groove can be on the rear surface 64 of the target 60. Other centering and alignment arrangements also can be provided.

The apparatus further includes a control unit 80 that preferably communicates wirelessly with the target 60. The control unit 80 is operative to store signals received by the target 60 and converts those signals into measurement data indicative of the flatness of the plate 100, as explained further below.

The apparatus 10 is used by mounting the rail 12 on the surface of the plate 100 that is to be assessed for flatness. For example, the rail 12 can be mounted to extend along one of the eight lines defined by the Moody diagram of FIG. 1. The rail 12 can be fixed in position on the surface of the plate 100 by appropriate clamps, such as the vacuum clamps 102 shown in FIGS. 1 and 2. The laser assembly 14 then is mounted to the rail 12 at a position in proximity to an edge of the plate 100. The target assembly 16 is mounted to a first position along the rail 12 so that the photosensitive cell 66 of the target 60 is facing toward the laser emitter 20. The laser emitter 20 is activated so that the laser beam B is directed toward the target 60 and impinges upon the photosensitive cell 66 to produce a signal indicative of the location of the center of energy of the laser beam B on the photosensitive cell 66. That signal is stored by a memory of the control unit 80. The target assembly 16 then is repositioned along the rail 12 and a further reading is taken and stored. This procedure is repeated along the length of the rail 12 until a predetermined number of readings is taken along the length of the rail 12. The rail 12 then is repositioned to another one of the eight lines specified by the Moody diagram and readings are taken again.

The apparatus, system and method described and illustrated above offer efficiencies when compared to other known systems and methods for assessing flatness of the plate. In particular, the rail of the disclosed system is used merely for aligning the laser assembly 14 and the target assembly 16 relative to the lines of the Moody diagram along which relative height positions are measured. The laser assembly and the target assembly are mounted directly on the plate that is being assessed for flatness, thereby avoiding the complexities of having either the laser assembly or the target assembly positioned on a rail or beam that is suspended above the plate and capable of sagging due to forces of gravity. Additionally, there is no need to measure height distances between the plate and a measurement apparatus that is positioned above the plate. The laser beam need not be reflected by a penta prism mounted in the target assembly, thereby simplifying the target assembly and avoiding the costs associated with a more complex target.

The invention has been described with respect to a preferred embodiment. However, various modifications will be apparent to those skilled in this art after having read the subject disclosure. Thus, the invention is defined by the appended claims and not by the illustrated embodiments.

What is claimed:
1. A flatness measuring apparatus for measuring flatness of a surface of a plate, comprising:
a rail having opposite first and second ends, at least parts of the rail between the first and second ends being positionable on the plate;
a laser assembly having a laser base with a lower surface, at least a first part of the lower surface of the laser base being mounted to a position on the rail in proximity to the first end of the rail, a laser emitter mounted to the laser base and being configured to direct a laser beam substantially parallel to the rail and offset laterally from the rail; and
a target assembly having a target base with a lower surface movably positionable on the plate at a position laterally adjacent to the rail and spaced from the first end of the rail, the target base having a front surface aligned perpendicular to the lower surface of the target base, and a target mounted to the front surface of the target mooning base, the target having a photosensitive cell facing the laser emitter and configured to identify a location of a point of impingement of a laser beam from the laser emitter.

2. The flatness measuring apparatus of claim 1, the rail has an upper surface that includes indicia indicating distance measurements from the first end of the rail to the second end of the rail.

3. The flatness measuring apparatus of claim 1 wherein the front surface of the target base and a rear surface of the target have interengageable alignment structures for aligning the target to the target base.

4. The flatness measuring apparatus of claim 1, wherein the lower surface of the laser base has a channel and the rail being received slideably in the channel.

5. The flatness measuring apparatus of claim 1, further comprising a control unit connected to the target, the control unit receiving signals from the target indicative of positions of impingement of the laser beam on the photosensitive cell of the target.

6. The flatness measuring apparatus of claim 5, wherein the control unit comprises a memory for storing the signals received from the target indicative of positions of impingement of the laser beam on the photosensitive cell of the target.

7. The flatness measuring apparatus of claim 1, further comprising clamps for removably holding the rail on the plate.

8. The flatness measuring apparatus of claim 1, wherein the bottom surface of the laser base further includes a second part that is supported on the plate.

9. A method for measuring flatness of a plate, comprising the steps of:
 a. providing a rail having opposite first and second ends;
 b. mounting the rail at a first position on the plate;
 c. mounting a laser assembly on the plate in a position adjacent the first end of the rail, the laser assembly including a laser emitter configured for emitting a laser beam;
 d. mounting a target assembly on the plate at a first position adjacent the rail and at a first distance from the first end of the rail, the target assembly including a photosensitive cell;
 e. directing the laser beam from the laser emitter to the target cell while the target assembly is at the first position, and identifying a point of impingement of the laser beam on the photosensitive cell;
 f. sequentially moving the target assembly to a subsequent positions adjacent the rail and at a subsequent distances from the first end of the rail;
 g. directing the laser beam from the laser emitter to the target cell while the target assembly is at each of the subsequent positions, and identifying points of impingement of the laser beam on the target cell at each of the subsequent positions of the target cell; and
 h. comparing the points of impingement of the laser beam on the target cell at each of the positions of the target assembly along the rail for identifying locations on the plate that are not level.

10. The method of claim 9, further comprising moving the rail to a second position on the plate and then repeating steps c through h.

* * * * *